No. 757,913. PATENTED APR. 19, 1904.
D. GRIFFITH.
SALE RECORDER.
APPLICATION FILED JUNE 6, 1903.
NO MODEL. 2 SHEETS—SHEET 1.
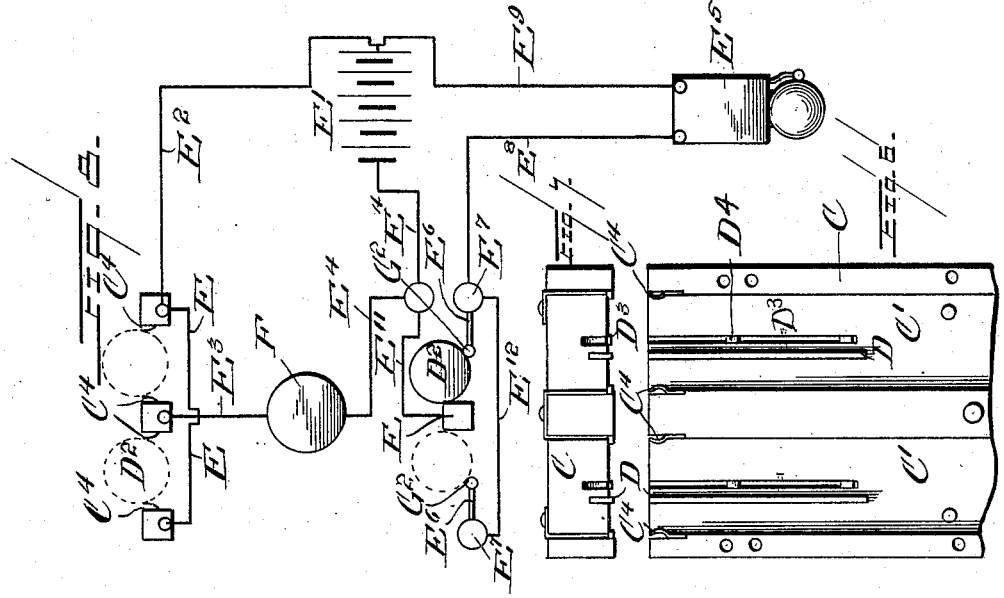
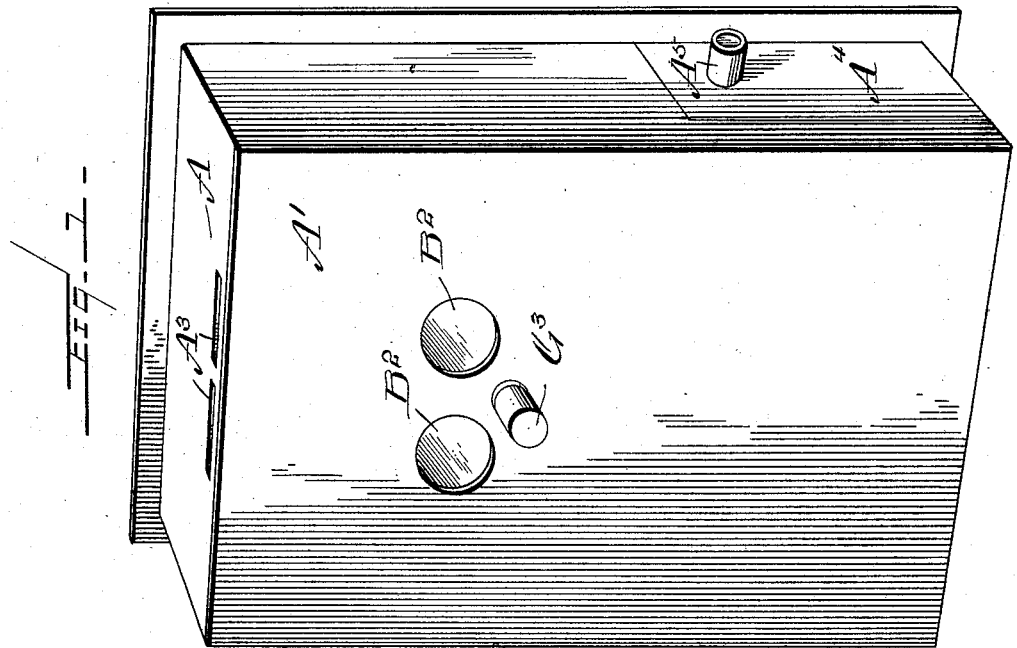
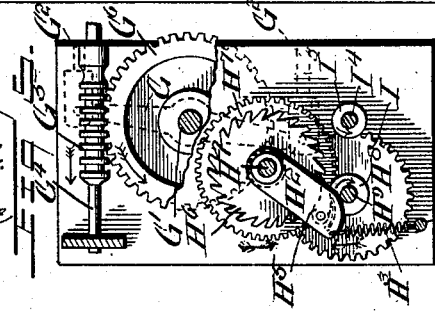
WITNESSES:
INVENTOR
Daniel Griffith,
By E. R. Stocking
Attorney No. 757,913. PATENTED APR. 19, 1904.
D. GRIFFITH.
SALE RECORDER.
APPLICATION FILED JUNE 6, 1903.
NO MODEL. 2 SHEETS—SHEET 2.
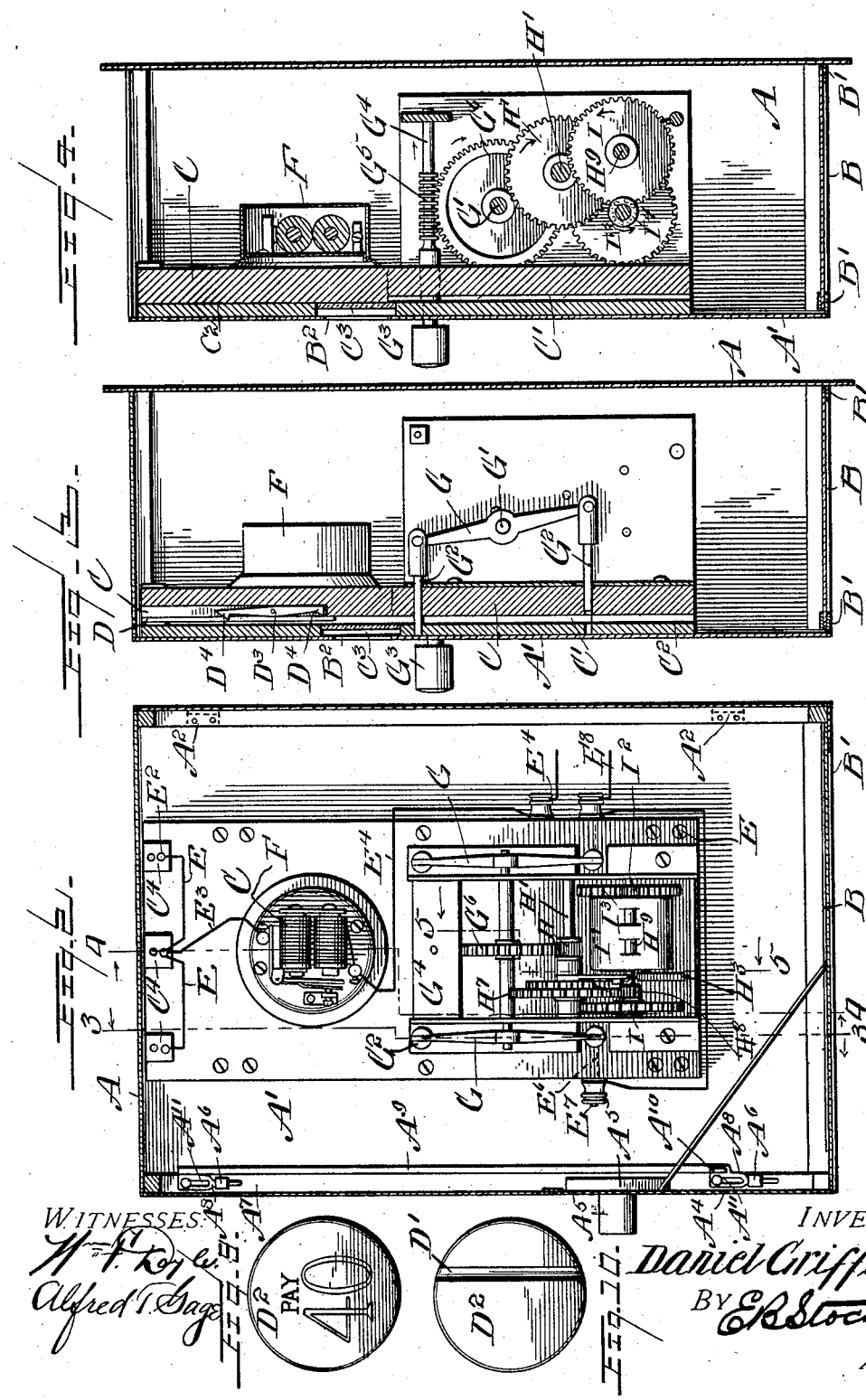
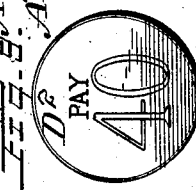
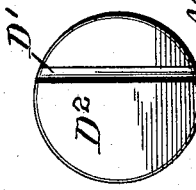
WITNESSES
INVENTOR
Daniel Griffith.
BY
Attorney No. 757,913. Patented April 19, 1904.

UNITED STATES PATENT OFFICE.

DANIEL GRIFFITH, OF BUTTE, MONTANA.

SALE-RECORDER.

SPECIFICATION forming part of Letters Patent No. 757,913, dated April 19, 1904.

Application filed June 6, 1903. Serial No. 160,367. (No model.)

*To all whom it may concern:*

Be it known that I, DANIEL GRIFFITH, a citizen of the United States, residing at Butte, in the county of Silverbow, State of Montana, have invented certain new and useful Improvements in Sale-Recorders, of which the following is a specification, reference being had therein to the accompanying drawings.

This invention relates to a sale-recorder, and particularly to a check-controlled device within which the check deposited is retained as a record of the sale.

The invention has for an object to provide a device into which a check representing the amount of the purchase may be deposited by a waiter or salesman and when so deposited an audible signal calls attention to the check, which is visible through an aperture in the casing. The check remains in this position until it is again desired to call a waiter or salesman, when it is released by a suitable device and in falling actuates a call device or mechanism to again summons the waiter or salesman.

A further object of the invention is to arrange this call mechanism so that the signal therefrom shall be of a predetermined period and after the check is released from the call device and deposited in the casing of the recorder the latter cannot be operated until another check is inserted therein.

The invention has for a further object to provide a novel construction and arrangement of electrical connections for operating the signal device and also the call device during the passage of the check through the recorder and before its final deposit therein.

In the drawings, Figure 1 is a perspective of the invention inclosed within a casing. Fig. 2 is a vertical longitudinal section thereof. Fig. 3 is a vertical cross-section on the line 3 3 of Fig. 2. Fig. 4 is a similar view on the line 4 4 of Fig. 2. Fig. 5 is a similar view of the call-regulating mechanism on the line 5 5 of Fig. 2. Fig. 6 is an elevation of the check chute or slide. Fig. 7 is a top plan thereof. Fig. 8 is a diagram of the electric circuits for operating the signal and call devices. Fig. 9 is a front view of one of the checks, and Fig. 10 is a rear view thereof.

Like letters of reference refer to like parts in the several figures of the drawings.

The letter A designates a casing, which may be of any desired material or configuration and suitably attached to a support. This casing may also be provided with a door $A'$, hinged to the front thereof, as at $A^2$, Fig. 2, and with openings $A^3$ in its top for the introduction of the checks therein, while it is also shown as provided at one end with a slide or drawer $A^4$, provided with a lock mechanism $A^5$, which drawer when removed permits access to the interior of the casing and also to the door-securing mechanism, which is of any preferred construction. In the present illustration of the case the operative parts of the invention are mounted upon the inner face of this door $A'$, and the door is provided with one or more loops $A^6$, adapted to pass through a suitable aperture in the flange $A^7$ of the casing and be secured by sliding bolts $A^8$, connected together by a rod $A^9$, having a finger-piece $A^{10}$ for operating same, said bolts being guided by means of a slide-and-pin connection $A^{11}$. The lower portion B of this slide or drawer travels in suitable ways $B'$ at the lower portion of the casing and forms the bottom thereof, so that when removed the checks resting therein are removed therewith.

The check-chute C, as heretofore mentioned, is in the present illustration shown as applied to the inner surface of the door and secured by any suitable means thereto. In the drawings two of these chutes C are shown parallel with each other, by the use of which a less number of checks is required; but as they are duplicates of each other it is only necessary to describe the construction and operation of one thereof, as they may be further multiplied to any desired extent. The check-chute is provided with a channel $C'$ upon its face, which may be covered by a plate $C^2$, lying against the door of the casing, said plate being provided with an aperture $C^3$ in alinement with the aperture $B^2$ in the door, by which the check introduced into the casing may be observed. The upper portion of this channel is provided with a rib D, which is adapted to engage a slot $D'$, formed upon the back of the check $D^2$, as shown in Fig. 10, so as to guide the introduction of the check in the proper position, while parallel with this rib is a guard-pawl $D^3$, pivotally mounted at the rear of the channel, so that the opposite ends $D^4$ thereof alternately project into the path of the check as it passes the same, preventing the withdrawal of the check when once introduced into the channel. At the upper end of this channel contact-plates $C^4$ are provided at opposite sides. One of these contacts for each channel is connected with the other by means of the line E and the two carried into circuit with the battery $E'$ by means of the line $E^2$, while the opposite contacts from each channel are in circuit with the audible signal F of any desired construction—for instance, a buzzer—by means of the line $E^3$, said signal F being connected with the opposite pole of the battery E by the line $E^4$. By this construction when the check is introduced circuit is established through the buzzer and the audible signal given by which attention is called to the check as it lies at the aperture $B^2$, where it is temporarily supported by any suitable means.

The mechanism hereinbefore described is adapted to sound a signal when the check is introduced, and the check remains visible to the purchaser until such a time as it is desired to again call a waiter for a further order. For the purpose of thus supporting the check at the opening of the casing an arrester G is provided, secured to a shaft $G'$, while the opposite ends thereof are pivotally secured to sliding arms $G^2$, upon which the check rests at different times and which are alternately projected across the chute. For the purpose of operating these arms any desired means may be used. For instance, the push-button $G^3$ may be slidingly mounted in a suitable frame by means of the rod $G^4$, which carries a worm-gear $G^5$. This gear in turn meshes with a pinion $G^6$, secured upon the shaft $G'$, on which arresters G are secured, so that a rotation is imparted to this shaft when the push-rod is reciprocated in one direction and the upper arms $G^2$ withdrawn from the chute as the lower arms pass into the chute, thus dropping the check from the upper to the lower arms. These lower arms $G^2$ are electrically connected with the battery $E'$ and a call-bell $E^5$ by means of a conducting-rod $E^6$, extending to a connector $E^7$, from which a line-wire $E^8$ extends to the call-bell, while a return-wire $E^9$ extends from this bell to the battery. At the opposite side of the chute from the arrester-arm $G^2$ is a contact-plate $E^{10}$, which is in circuit by means of the line $E^{11}$ and the common return $E^4$ with the battery $E'$, so that when the check contacts with this plate and the arm a circuit is established by which the call-bell will be rung. When two chutes are used, the conducting-rods $E^6$ are connected in circuit by means of the line-wire $E^{12}$, extending between the posts $E^7$. It now remains to release the check from the lower supporting-arm and restore the parts to their initial position and at the same time break the circuit through the call-bell. This is accomplished by means of the restoring mechanism comprising a barrel-gear H, disposed upon a sleeve secured on a pivoted shaft $H'$, which sleeve also carries a lever $H^2$, having a restoring-spring $H^3$ extending from its free end and secured to the casing at $H^4$. This lever is provided with a pawl $H^5$, coöperating with a ratchet-wheel $H^6$, loosely mounted upon the shaft $H'$, so as to turn said wheel and also the pinion $H^7$, carried by the hub thereof, in the downward movement of the lever $H^2$. This pinion $H^7$ meshes with the barrel-gear $H^8$ upon the shaft $H^9$, which shaft carries a gear I and fan-governor $I'$. The shaft $H^9$ is also provided with a pinion $I^2$, meshing with a gear $I^3$ upon a shaft $I^4$, mounted parallel therewith, this shaft being also provided with a barrel $I^5$, meshing with the pinion I. This construction provides a governing apparatus by which the movement of the restoring-arms is timed, so that the check and call-bell are kept in circuit for a predetermined period.

In the operation of the invention the waiter or salesman deposits in the casing a check or checks indicating the amount of purchase, and the mechanism carried by the chute guides the introduction of the check or checks in proper position, while the contact established when the check or checks enter the chute at once sounds an audible signal, so that the attention of the purchaser is called thereto as the check lies before the opening. This check remains in position and is necessary for further operation of a subsequent call for a waiter or salesman. When it is desired to make such a call, the push-rod or other mechanism is forced inward, thus withdrawing the upper arrester-arm and drops the check to the lower arm, thus establishing circuit through the call-bell and continuing to operate this bell until the restoring device restores the arms to their initial position and the check drops to the bottom of the casing. This restoring device is placed in condition in the operation of withdrawing the upper arm as the worm-and-gear connections raise the lever, placing the spring under tension, and the pawl carried by this lever engages the ratchet-wheel which is geared to the governing mechanism described, so that the return of the lever is suitably timed to continue ringing the call-bell. The check when it falls to the bottom of the casing remains therein as a record of the sale, and by a comparison of the checks issued to each salesman or waiter an effective guard against dishonesty may be established.

It will be obvious that changes may be made in the details of construction and configuration and in the several operating devices without departing from the spirit of the invention as defined by the appended claims.

What I claim is—

1. In a device of the class described, a casing provided with a check-chute, a check coöperating with said chute, electrical means carried by the chute for automatically sounding an audible signal upon the introduction of the check, means for supporting said check to effect a secondary signal subsequent to the primary signal, and means for automatically releasing said check from said supporting means.

2. In a device of the class described, a casing provided with a check-chute, a check coöperating with said chute, electrical means carried by the chute for automatically sounding an audible signal upon the introduction of the check, and means for supporting said check to effect a secondary signal subsequent to the primary signal.

3. In a device of the class described, a casing provided with a check-chute, a check coöperating with said chute, means carried by said chute for sounding an audible signal upon the introduction of the check, means for supporting said check opposite an opening in said casing, a call-bell, and an arrester mechanism for supporting said check in circuit with said call-bell.

4. In a device of the class described, a casing provided with a check-chute, a check coöperating with said chute, means carried by said chute for sounding an audible signal upon the introduction of the check, means for supporting said check opposite an opening in said casing, a call-bell, an arrester mechanism for supporting said check in circuit with said call-bell, and a governor mechanism for timing the restoring movement of said arrester.

5. In a device of the class described, a casing provided with a chute, a check of conducting material adapted to enter said chute, a signal within said casing, contacts at opposite sides of said chute to establish circuit through said check with said signal and a battery, a face-plate provided with an opening opposite said chute through which said check may be observed, a secondary signal having circuit-contacts in the path of said check, and means for releasing said check from said latter contacts.

6. In a device of the class described, a casing provided with a chute, a check of conducting material adapted to enter said chute, a signal within said casing, contacts at opposite sides of said chute in circuit with said signal and a battery, a face-plate provided with an opening opposite said chute through which said check may be observed, a contact at one side of the lower portion of said chute in circuit with the battery, and a movable contact at the opposite side of the lower portion of said chute in circuit with the call-bell.

7. In a device of the class described, a casing provided with a check-chute, a check formed of conducting material, an electrically-operated signal adapted to be automatically actuated by the introduction of said check, manually-operated means for supporting said check opposite an opening in the casing, an automatic restoring device placed under tension in the travel of the supporting means to release the check, and arrester means moved into the path of the released check in the initial movement of the restoring mechanism.

8. In a device of the class described, a casing provided with a check-chute, a check adapted to travel in said chute and provided with a channel upon one face, a rib carried by said chute to enter said channel, and a pivoted guard provided with projections at opposite ends beveled upon their upper faces and mounted parallel to said chute to prevent the withdrawal of the check therefrom.

9. In a device of the class described, a casing provided with a check-chute, a check adapted to travel in said chute and provided with a channel upon one face, a rib carried by said chute to enter said channel, a pivoted guard mounted in said chute to prevent the withdrawal of the check therefrom, contact-plates at opposite sides of said chute to engage said check, and a signal and battery in circuit with said contacts.

10. In a device of the class described, a casing provided with a check-chute, a check adapted to pass through said chute, an arrester mechanism comprising an oscillating lever having arms at its opposite ends adapted to be alternately projected through said chute in different horizontal planes, and means for operating said arrester mechanism.

11. In a device of the class described, a casing provided with a check-chute, a check adapted to pass through said chute, an arrester mechanism comprising an oscillating lever having arms at its opposite ends adapted to be alternately projected through said chute, means for operating said arrester mechanism, a spring device for restoring said arrester mechanism to its initial position, and a governor mechanism for timing said restoring action.

12. In a device of the class described, a casing provided with a check-chute, a check adapted to pass through said chute, an arrester mechanism comprising an oscillating lever having arms at its opposite ends adapted to be alternately projected through said chute, means for operating said arrester mechanism, a spring device for restoring said arrester mechanism to its initial position, a governor mechanism for timing said restoring action, an electrical connection with one of the restoring-arms, a call-bell in circuit with said mechanism and a battery, and a contact opposite said arrester-arm in circuit with said battery.

13. In a device of the class described, a casing provided with a check-chute, a check adapted to pass through said chute, an arrester mechanism comprising an oscillating lever and supporting the arms at the opposite ends, a gear-wheel upon a shaft of said lever, a push-rod provided with a worm to engage said gear, a pivotally-mounted restoring-lever having its hub rotatable with said gear, and a spring extending from the free end of said restoring-lever to a fixed support.

14. In a device of the class described, a casing provided with a check-chute, a check adapted to pass through said chute, an arrester mechanism comprising an oscillating lever for supporting the arms at the opposite ends, a gear-wheel upon a shaft of said lever, a push-rod provided with a worm to engage said gear, a pivotally-mounted restoring-lever having its hub rotatable with said gear, a spring extending from the free end of said restoring-lever to a fixed support, a ratchet-wheel and gear rotatably mounted upon the shaft of said restoring-lever, a pawl carried by said restoring-lever to engage said ratchet-wheel, a shaft carrying a governor and provided with a pinion meshing with a gear carried by the ratchet-wheel, a gear-wheel and pinion at the opposite end of said shaft, and a counter-shaft parallel with said governor-shaft and provided with gears meshing with the wheel and pinion thereon.

15. In a device of the class described, a casing provided with a pivoted door, a drawer forming the bottom of said casing, and check-controlled devices mounted upon said inner face of the door in alinement with an opening at the top of the casing.

16. In a device of the class described, a casing provided with a pivoted door, a drawer forming the bottom of said casing, check-controlled devices mounted upon the inner face of said door in alinement with an opening at the top of the casing, a sliding bolt disposed within said casing to engage the projection from said door when closed, and a lock mechanism for said drawer.

17. In a device of the class described, a casing provided with a check-chute, a check formed of conducting material, an electrically-operated signal adapted to be actuated by the introduction of said check, means for supporting said check opposite an opening in said casing, manually-operated means for releasing said check from said support, a call-bell, means for automatically supporting said check in circuit with said call-bell, and means for automatically depositing said check at the lower portion of the casing.

In testimony whereof I affix my signature in presence of two witnesses.

DANIEL GRIFFITH.

Witnesses:
W. J. KENNEDY,
JAS. R. GRIFFITH.